(No Model.) 3 Sheets—Sheet 1.
J. LYNCH.
CONDUIT FOR ELECTRIC OR CABLE RAILROADS.

No. 432,416. Patented July 15, 1890.

ATTEST.
J. Henry Kaiser
Victor J. Evans

INVENTOR.
John Lynch
By Paine & Ladd
attys.

(No Model.) 3 Sheets—Sheet 2.
J. LYNCH.
CONDUIT FOR ELECTRIC OR CABLE RAILROADS.
No. 432,416. Patented July 15, 1890.
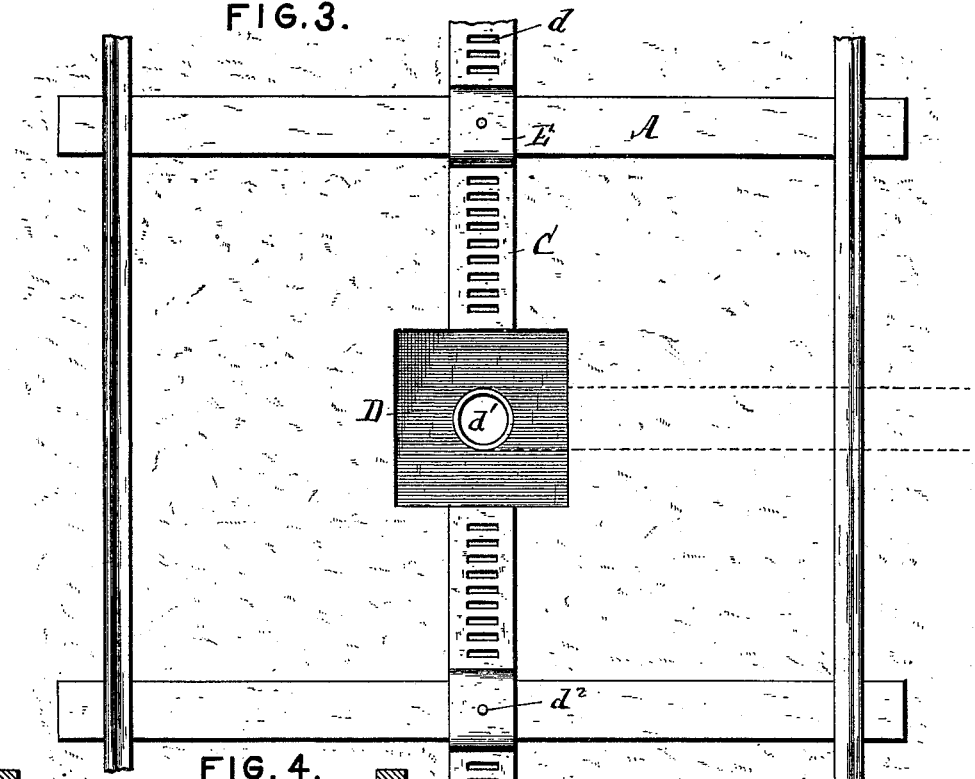
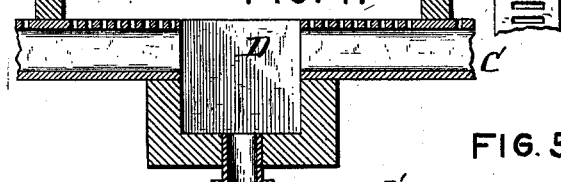
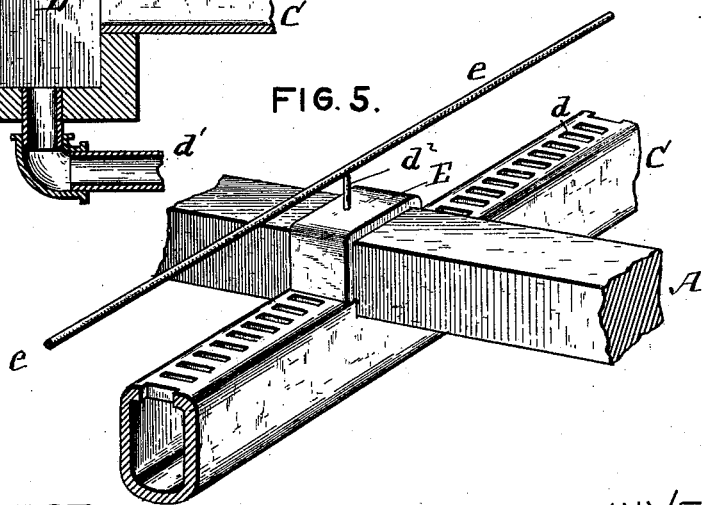
ATTEST.
J. Henry Kaiser
Victor J. Evans.
INVENTOR.
John Lynch
By Paine & Ladd
attys.

(No Model.) 3 Sheets—Sheet 3.
J. LYNCH.
CONDUIT FOR ELECTRIC OR CABLE RAILROADS.
No. 432,416. Patented July 15, 1890.
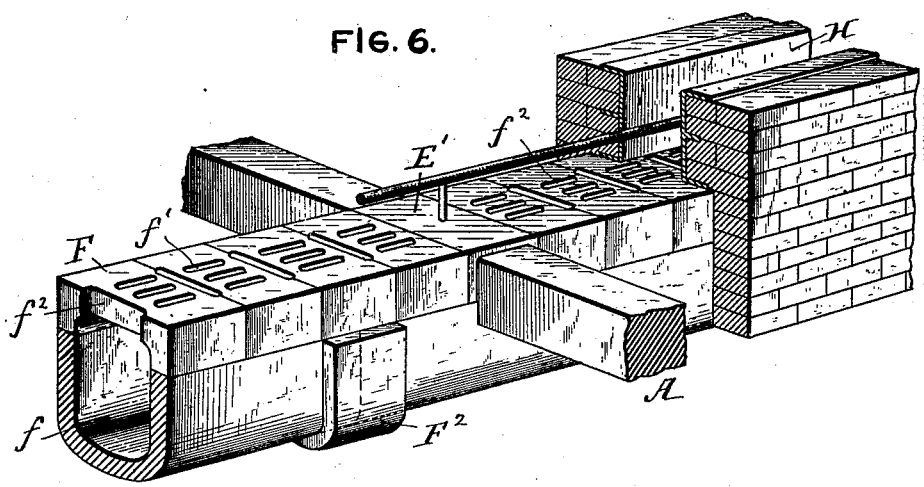
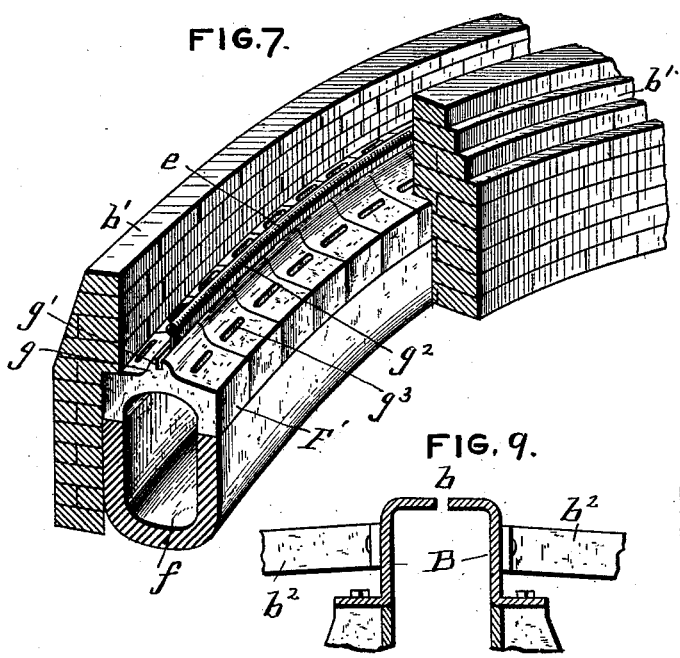
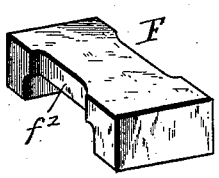
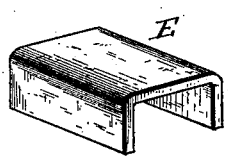
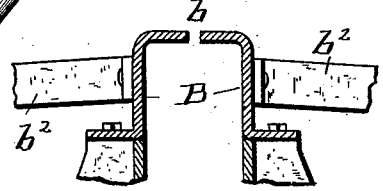
ATTEST.
J. Henry Kaiser
Victor J. Evans.
INVENTOR.
John Lynch
By Caine & Ladd
attys.

UNITED STATES PATENT OFFICE.

JOHN LYNCH, OF WASHINGTON, DISTRICT OF COLUMBIA.

CONDUIT FOR ELECTRIC OR CABLE RAILROADS.

SPECIFICATION forming part of Letters Patent No. 432,416, dated July 15, 1890.

Application filed May 11, 1889. Serial No. 310,455. (No model.)

*To all whom it may concern:*

Be it known that I, JOHN LYNCH, a citizen of the United States, residing at Washington, in the District of Columbia, have invented certain new and useful Improvements in Conduits for Electric and Cable Railroads; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention pertains to certain new and useful improvements in electric railways and means for effecting the drainage from the electric-conductor chamber.

The invention has for its object the production of a drainage-conduit composed of an electric non-conductor for effecting the drainage or removing of all water, dirt, trash, &c., which collects in an underground electric-conductor chamber and conveying the same at suitable points into man-holes, and from thence to sewers through branch-pipe connections.

The invention has for a further object simplicity of construction, durability, and general efficiency, and it also comprises the detail, construction, and arrangement of parts, substantially as hereinafter fully set forth.

Figure 1:
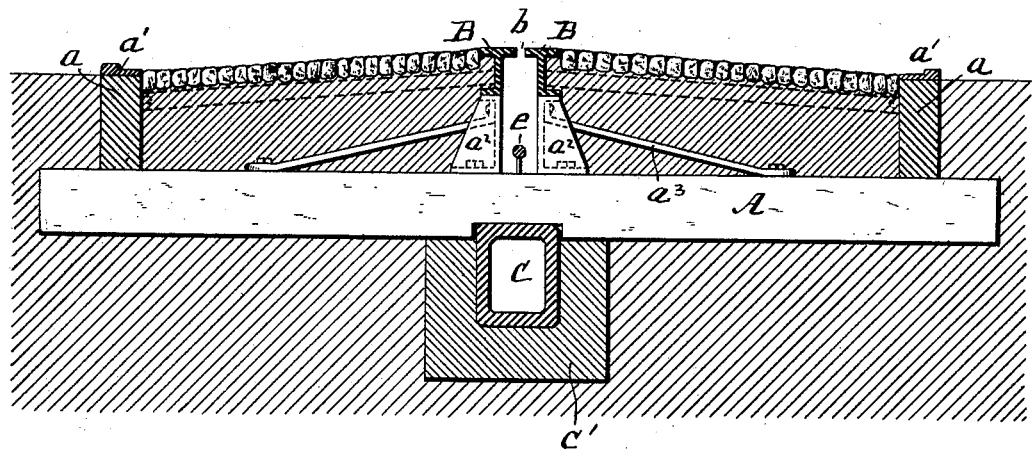
Figure 2:
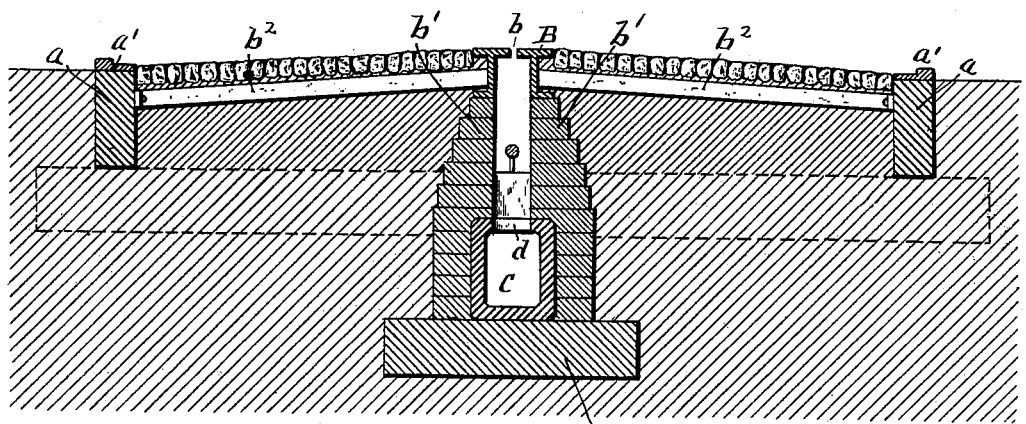

In the accompanying drawings, Figure 1 is a vertical sectional view taken adjacent a cross-tie and showing my invention. Fig. 2 is a similar view taken about midway between two ties. Fig. 3 is a plan view. Fig. 4 is a detail sectional view showing the man-hole-connection with the conduit. Fig. 5 is a detail perspective view of a portion of a tie and conduit, the latter being slightly modified. Fig. 6 is an enlarged similar view illustrating a modification of my drainage-conduit. Fig. 7 is a view illustrating the arrangement around a curve. Figs. 8 and 10 are details. Fig. 9 is a view of a modification.

Referring to the drawings, A designates the ties, $a$ the stringers, and $a'$ the rails secured thereon. To tie A are secured two angle-plates $a^2$, braced in position by inclined bars $a^3$, secured thereto and to said tie.

B B are approximately T-shaped plates oppositely disposed to form a central opening $b$. These T-plates are secured upon the angle-plates $a^2$ and rest upon corresponding brick walls $b'$ $b'$, built up between the ties. These plates are additionally secured by brace-bars $b^2$, secured thereto and to the stringers $a$. In lieu of the T-plates B, I may use the bent or angular plates B', (shown in Fig. 9,) the same being likewise secured in place.

C designates my improved drainage-conduit formed in sections running longitudinally the length of the track. This conduit is let into grooves in the under side of ties A, and is seated in a concrete bed C', as shown in Fig. 1; but between the ties said conduit is closed by brick walls $b'$, and like said walls rests upon a bed $C^2$, as shown in Fig. 2. This drainage-conduit is composed of terra-cotta, each section being made in one piece. In its upper wall is formed a series of transverse slots or openings $d$, through which water, dirt, &c., passes down into the conduit. At suitable distances apart the sections of the conduit open into man-holes D, for emptying water, dirt, &c., which is conveyed through a branch pipe $d'$ to the street-sewer. An approximately U-shape plate E of terra-cotta caps each tie at the point of intersection with the conduit, and from it projects a short post $d^2$ for supporting the electric conductor $e$. The conduit C and plates E being made of terra-cotta, which is a perfect non-conductor, no loss of power or energy is occasioned.

The terra-cotta conduit has been described as being made of one continuous piece; but I do not limit myself thereto, for, as shown in Fig. 6, the lower U-shape portion $f$ thereof is alone made in one piece and is provided with a cover composed of a series of closely-fitting blocks F. In these blocks transverse slots or openings $f'$ are formed, and in their sides are grooves or recesses $f^2$, which, when the blocks are placed together, form additional communication with the conduit. In this form the tie A is shown as cut out on the under side to receive the conduit, and the covering-plate E' is, as shown, slightly elongated and forms a flush connection between the blocks F.

At the point of conjunction of two sections of the conduit I employ an approximately U-shape bed-plate $E^2$, hugging the sides of the conduit and firmly uniting the sections.

In Fig. 7 I have shown the conduit as constructed for a curve or bend. In this form the blocks F' have a central raised portion $g$ in a groove $g'$, of which a supporting-plate $g^2$ for the conductor is secured. On either side of this central raised portion slots $g^3$ are formed opening into the conduit.

It will be seen that I have produced a drainage-conduit for electric railways that is extremely simple, one that can be readily and easily constructed, and that by means thereof all dirt, trash, &c., will readily fall (or can be forced by a brush projected through the opening $b$) into the conduit and carried into the man-holes, from which it passes to the sewer.

A conduit of terra-cotta, in addition to being very durable and lasting, is a perfect non-conductor, and hence no power is detracted from the electric conductor passed thereover.

For the purpose of securing more thorough insulation of the walls of the electric-conductor conduit they may be lined with glazed terra-cotta plates H, as shown in Fig. 6.

It will be understood that so far as the drainage features of this invention are concerned they are not restricted solely to conduits or electric railways, but are applicable to conduits for cable roads as well, and so far as the drainage-conduit is applicable to a cable-conduit the latter comes within the scope of this invention.

While I prefer to make the conduit of terra-cotta, I do not limit myself thereto, for the same may be made of any other non-conducting material. Better results are, however, obtained by the use of terra-cotta.

I claim as my invention—

1. A drainage-conduit for electric railways, composed of an electric non-conductor and having projecting supports for the electric conductor for supporting the latter above said conduit, substantially as set forth.

2. The herein-described improved system of drainage for electric railways, consisting of a conduit of terra-cotta formed in sections provided with upper slots or openings, and man-holes periodically arranged, into which said conduit opens, in combination with the electric conductor disposed above said conduit, substantially as set forth.

3. The inclosing blocks or plates of terra-cotta, having the short supporting-posts for the electric conductor and inclosing the cross-ties, substantially as set forth.

4. The herein-described improvement in electric railways, comprising the drainage-conduit of terra-cotta, the supporting-bed therefor, the inclosing walls, and the plates or blocks inclosing the ties having short posts for the electric conductor, substantially as set forth.

5. As an improvement in electric railways, the combination, with the ties and sleepers, of the angle-plates secured to said ties, the opposite parallel plates secured upon said angle-plates, and the inclined brace-bars $a^3$ $b^2$, substantially as set forth.

In testimony whereof I affix my signature in presence of two witnesses.

JOHN LYNCH.

Witnesses:
 STORY B. LADD,
 G. Y. ATLEE.